May 23, 1939.　　　　E. BABCOCK　　　　2,159,418
ELECTRICAL LOGGING APPARATUS
Filed Oct. 19, 1936
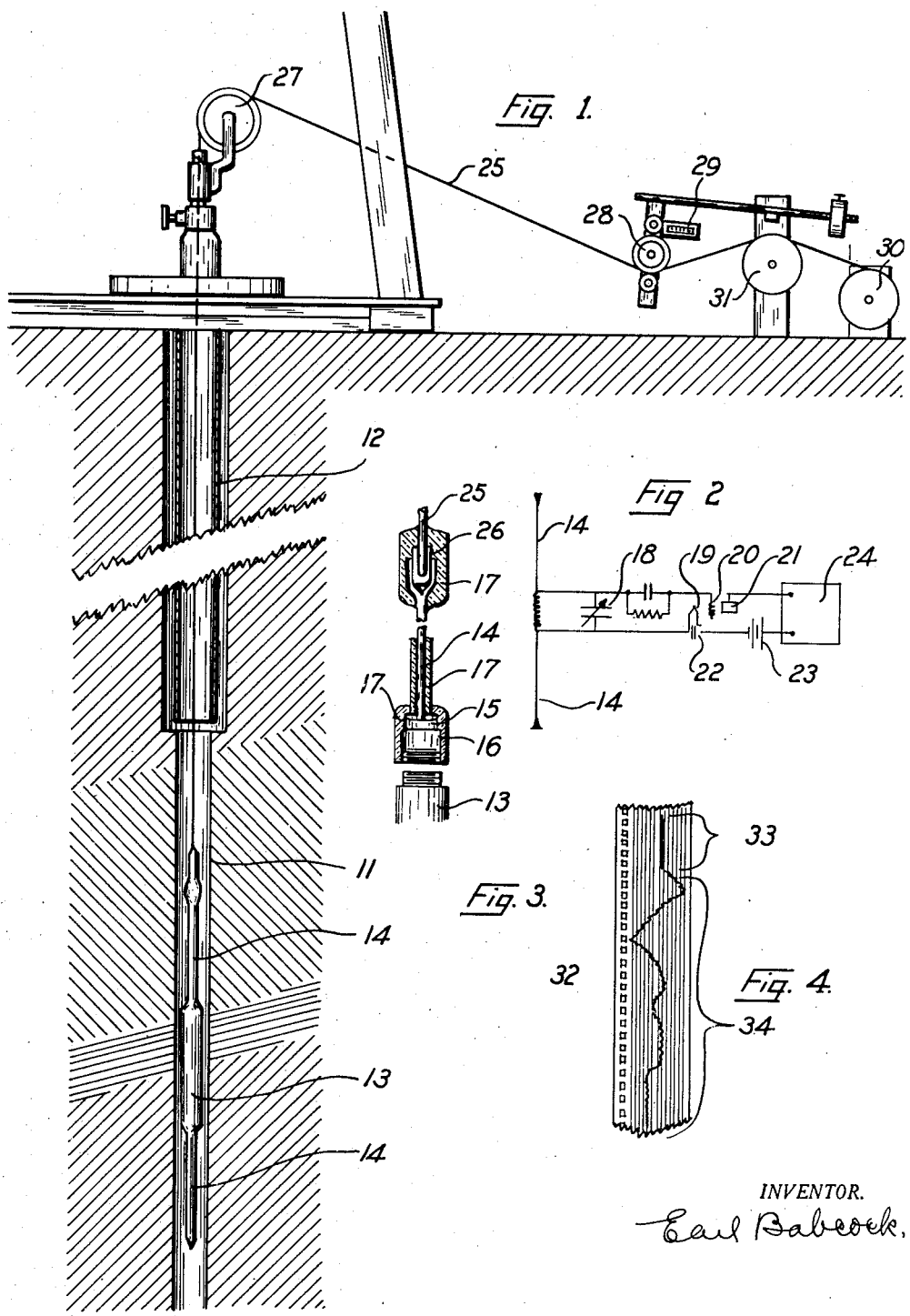
INVENTOR.
Earl Babcock, Patented May 23, 1939

2,159,418

UNITED STATES PATENT OFFICE 2,159,418

ELECTRICAL LOGGING APPARATUS

Earl Babcock, Duncan, Okla., assignor to Halliburton Oil Well Cementing Company, Duncan, Okla.

Application October 19, 1936, Serial No. 106,351

1 Claim. (Cl. 175—182)

This invention relates to electrical exploring or geophysical measuring devices, and more particularly to an arrangement for electrically logging wells.

It is known to log or determine the nature of the formations of a well by placing electrodes, antennae or other conducting elements in spaced relation within a well and measure or indicate variations in the electric properties such as the di-electric strength, resistance or impedance of the formation around or between the electrodes. Examples of these systems are found in the United States Patents to Jakosky, No. 2,038,046 and Martiennsen, No. 2,018,080.

In the electrical logging systems of which I am aware, the measuring or indicating is done by instruments located at the surface of the well and it has been necessary to connect the electrodes or the antennae in the well to the instruments at the surface by means of one or more electrical conductors. These electrical conductors are very expensive. In order to enable them to withstand wear and tear in the well, lead sheathed cables are usually employed. These are heavy and require large machinery to handle them, as will be apparent when it is recalled that some modern wells are over two miles deep. The power required to lift a lead cable two miles long is considerable.

Other mechanical difficulties, such as the cable breaking or the insulation becoming defective, have been experienced.

Moreover, there are considerable electric losses in a long conductor, especially where separated from the earth only a few inches, as in a well, and these losses have made the currents supplied to the indicating instruments weak and unreliable.

It is an object of the present invention to obviate these difficulties by devising an arrangement for electrically logging an oil well or the like in which all conductors between instruments on the surface of the well and those in the well are dispensed with.

It is a further object of the invention to devise a self-contained unit in which all of the electrical apparatus for logging the well is mounted and adapted to be lowered into the well by some means, such as a steel tape or measuring line, which can be properly designed for strength and which need not be used as an electrical conductor.

Other objects and advantages reside in certain novel features of the arrangement and construction of the parts, as will be apparent from the following description taken in connection with the accompanying drawing, in which:

Fig. 1 is an illustration of a vertical cross-section of an oil well with apparatus constructed in accordance with the present invention mounted in and adjacent the well.

Fig. 2 is a diagram of an electrical system which illustrates one way of measuring the electrical properties of the formation of a well in accordance with the present invention.

Fig. 3 is a fragmentary view, partially in cross-section, of a portion of the casing and one electrode shown in Fig. 1; and Fig. 4 is a view of a fragmentary portion of a chart on which characteristics of the formation of a well are recorded by apparatus like that diagrammatically shown in Fig. 2.

Referring to the drawing in detail, and first to the illustration of Fig. 1, it will be seen that an oil well is there illustrated at 11. The well may be provided with a casing 12 through a portion of its length, as illustrated in Fig. 1, but it will be apparent to those skilled in the art that the present invention is adapted for use in wells wholly cased, or those without any casing therein.

In accordance with the present invention, it is proposed to provide a self-contained and compact apparatus for logging the formation of the well. To this end, a strong casing 13 is provided and it is so constructed as to house and protect the electrical apparatus. Because the well may have a small bore, the casing 13 should be only a few inches in diameter. In order to house all of the electrical apparatus it may be several feet in length, however.

At each end of the casing 13 an electrode or antennae 14 is provided. Each electrode may be provided with a head portion 15 and be secured to the casing 13 by means of end caps 16, one of which is shown in Fig. 3. It is preferable to insulate both electrodes from the casing 13 and from the caps 16, but it is within the purview of the invention to have one electrode connected to the casing or, for that matter, to use the casing 13 itself as one of the electrodes.

In the arrangement illustrated, the electrode 14 is insulated from the cap 16 by means of insulation 17, the lower portion of which may be clamped between the cap 16 and the head 15 of the electrode.

The heads 15 constitute terminals against which spring pressed connectors may abut to establish electrical contact with apparatus in the casing.

As illustrated in Fig. 2, the electrical apparatus contained within the casing 13, may consist of a simple electrical oscillating circuit vacuum tube circuit. This is illustrated as consisting of a variable condenser 18, a vacuum tube having a filament 19, a grid 20 and a plate 21, an A-battery 22, a B-battery 23, and an electrical indicating or recording instrument 24. The instrument 24 may be either a recording galvanometer, a recording frequency meter or the like.

In the arrangement illustrated in Fig. 2, an oscillating circuit may be set up and cause electrical impulses to be impressed upon the electrodes 14. Variations in the electrical characteristics, such as the di-electric strength of the formation adjacent the electrodes and around the casing 13, will tune the circuit to different frequencies and these variations may be recorded by the instrument 24.

The entire electrical system must be compactly assembled. Devices suitable for mounting in the confined space of the cylinder 14 including a recording frequency meter are now known to those skilled in the art, however. Similar apparatus confined in a similar small space is disclosed in the co-pending application of Carl W. Cooper, Serial No. 137,835, filed April 19, 1937 for Logging devices.

For supporting the assembled electrical apparatus and electrodes, a steel tape or steel cable may be connected to the upper electrode 14, as illustrated in Fig. 3. The steel tape 25 must be insulated from the electrode 14 and in the arrangement shown this is accomplished by means of the insulator 26 of usual construction. It is preferable also to insulate both electrodes 14 from the oil, water or mud which may normally be in the well, and for this purpose the insulation 17 has been shown extended and surrounding the joint between the electrode 14 and the steel tape 25. However, in cases where only the resistance of the formation is being indicated or recorded, (as where a direct current system, such as a Wheatstone bridge is used), the electrodes 14 are only partly insulated or are not insulated at all.

The steel tape 25 may extend upwardly from the electrical unit and pass over a sheave 27 at the top of the well and from there pass through a measuring device 28, which may be of the type shown in the United States patent to Halliburton, No. 1,692,037. The measuring device may be provided with an indicator 29, to show the number of feet of tape which has passed through and thus indicate the position of the electrical unit in the well. The apparatus also includes a reel or drum 30, around which the steel tape is wound, and also a suitable governor 31, such as a centrifugal governor, the construction of which may be of any suitable type known to those skilled in the art, and which will cause the tape to move at a constant speed.

As disclosed in my co-pending application, Serial No. 106,352, filed October 19, 1936 for "Method and means for measuring wells", it is possible to correlate the position of the electrical unit in the well and the particular characteristics of the formation recorded by the instrument 24, by means of the governor 31.

For example, assume that the instrument 24 makes a record on a tape like that illustrated at 32 in Fig. 4, and assume that the tape is driven at a constant speed by some suitable clock work. Assume that it is desired to log the oil well from a depth of 5,000 feet to a depth of 6,000 feet. The unit may be lowered to the depth of 5,000 feet as indicated by the indicator 29 on the measuring device. If held stationary in this position for a few minutes, substantially a straight line record will be made on the tape 32 of Fig. 4, as illustrated by the bracket 33. Since the apparatus is stationary, there will be no change in the electrical characteristic recorded during this time. When the apparatus is removed from the well, therefore, this point on the tape can be readily identified and it will be known that the record below the bracket 33 was taken when the electrical apparatus started to move downwardly from the depth of 5,000 feet. If now the apparatus is moved downwardly at a constant speed, say 1,000 feet per hour, the time element can now be eliminated because the tape 32 is also moving at a constant speed, say for example a distance represented by the bracket 34, in one hour. An inspection of the tape shows, therefore, that the record made within the bracket 34 indicates variations in the electrical properties of the formation from 5,000 to 6,000 feet, and a unit distance on the tape is equal to a unit distance in the well.

While only one embodiment of the invention has been shown and described herein, it is obvious that various changes may be made without departing from the spirit of the invention or the scope of the annexed claim.

I claim:

An arrangement for electrically logging an oil well or the like, including a cylindrical casing, a pair of electrodes, one mounted on each end of said casing, and electrical devices and an indicating instrument mounted within said casing, the entire electrical apparatus being self-contained and adapted to be lowered into the well as a unit to measure and indicate an electrical property of the formation of the well located between said electrodes.

EARL BABCOCK.